United States Patent
Chu et al.

(10) Patent No.: US 7,817,678 B2
(45) Date of Patent: Oct. 19, 2010

(54) METHOD AND APPARATUS FOR TIME ALIGNMENT ALONG A MULTI-NODE COMMUNICATION LINK

(75) Inventors: Chung Cheung Chu, Brossard (CA); Rafi Rabipour, Cote St-Luc (CA)

(73) Assignee: Genband US LLC, Plano, TX (US)

( * ) Notice: Subject to any disclaimer, the term of this patent is extended or adjusted under 35 U.S.C. 154(b) by 670 days.

(21) Appl. No.: 11/839,861

(22) Filed: Aug. 16, 2007

(65) Prior Publication Data

US 2009/0046698 A1 Feb. 19, 2009

(51) Int. Cl.
*H04J 3/06* (2006.01)
(52) U.S. Cl. .................................. 370/516; 370/503
(58) Field of Classification Search .............. 370/324, 370/353, 354, 519, 510, 503, 516, 518
See application file for complete search history.

(56) References Cited

U.S. PATENT DOCUMENTS

| 2004/0032836 | A1 | 2/2004 | Grilli et al. |
| 2004/0204932 | A1* | 10/2004 | Delfs et al. ............... 704/211 |
| 2004/0213199 | A1 | 10/2004 | Cheng |
| 2008/0174352 | A1* | 7/2008 | Miyakoshi et al. .......... 327/231 |

OTHER PUBLICATIONS

3GPP, 3rd Generation Partnership Project; Technical Specification Group Radio Access Network; UTRAN Iu interface user plane protocols (Release 7), © 2006, 64 pages.

* cited by examiner

*Primary Examiner*—Brenda Pham
(74) *Attorney, Agent, or Firm*—Jenkins, Wilson, Taylor & Hunt, P.A.

(57) ABSTRACT

A network entity, which comprises an input configured to receive from an upstream network entity a stream of first media data elements; an output configured to release towards a downstream network entity a stream of second media data elements; a processing engine configured to effect processing tasks on the first media data elements, thereby to generate the second media data elements, the processing tasks being effected in a set of processing intervals; and a control entity. The control entity is configured for receiving a request for a first phase adjustment from the downstream network entity; modifying the set of processing intervals in which are effected the processing tasks in an attempt to accommodate the first phase adjustment; determining a second phase adjustment based on arrival characteristics of the first media data elements and the modified set of processing intervals; and releasing towards the upstream network entity a request for the second phase adjustment.

21 Claims, 2 Drawing Sheets

METHOD AND APPARATUS FOR TIME ALIGNMENT ALONG A MULTI-NODE COMMUNICATION LINK

FIELD OF THE INVENTION

The present invention relates generally to telecommunications and, more specifically, to a method and apparatus for achieving time alignment across a communication link spanning multiple nodes of a communication system.

BACKGROUND

Speech processing units are an important part of modern digital communication systems such as mobile communication systems. For example, a speech processing unit located at a given node of a mobile communication system encodes sampled speech into packets for delivery to mobile end users reachable by a radio network node. The speech packets travel to the radio network node via one or more intermediate media gateways connected by packet-switched communication links. Speech processing units located at the intermediate media gateways may perform functions such as transcoding, voice enhancement, noise suppression and automatic gain control (AGC), to name a few. Individual speech processing units may perform processing functions for multiple users or "channels".

A given speech processing unit provides processing capacity by means of a processing engine (including one or several digital signal processors—DSPs) running various processing tasks. For example, when running a speech coding task, the processing engine operates on small segments of speech, known as "frames". Every frame of speech samples requires a certain amount of time to be processed and formulated into a packet of processed speech. The processing window of the processing engine (i.e., the amount of time between successive frames of speech samples) is divided into a number of processing intervals that have a corresponding duration (which can be fixed or variable) and activation instant (i.e., start time). Some of the processing intervals may be used for the aforesaid speech coding task, while others may be used for decoding and other tasks.

The manner in which processing tasks are scheduled can be based on various criteria, one of which may be to minimize the end-to-end delay between generation of a speech sample and transmission by the radio network node of a speech packet representing that speech sample. Another criterion could be to minimize the memory requirements of the radio network node. In these and other cases, it may be desirable to invoke a time alignment procedure.

An example of a time alignment procedure used in current systems is described in the Third Generation Partnership Project (3GPP) standardization document 25.415, hereby incorporated by reference herein. In accordance with the technique proposed in the above document, the radio network node sends a request to a given speech processing unit located upstream from the radio network node to apply a phase adjustment on the transmission of speech packets towards the radio network node. The given speech processing unit responds by attempting to satisfy the phase adjustment requested by the radio network node. This can be done by changing the duration or activation instant of the processing intervals assigned to specific processing tasks. The result is a new schedule for running the various processing tasks.

While the new schedule may benefit the radio network node by accommodating the requested phase adjustment, it may also have some unintended negative effects. For instance, the arrival of speech packets from a media gateway further upstream from the given speech processing unit may now clash with the new schedule. Specifically, the precise timing at which speech packets arrive from such further upstream media gateway may interfere with the ability of the given speech processing unit to handle multiple channels efficiently, given its new schedule. It may also result in increased buffering requirement on the given speech processing unit. As a result, speech packets may not be optimally processed by the given speech processing unit, and this may offset the benefit of having satisfied the phase adjustment requested by the radio network node.

Thus, there is a need in the industry to provide an improved mechanism for achieving time alignment along a multi-node communication link.

SUMMARY OF THE INVENTION

According to a first broad aspect, the present invention seeks to provide a network entity, which comprises an input configured to receive from an upstream network entity a stream of first media data elements; an output configured to release towards a downstream network entity a stream of second media data elements; a processing engine configured to effect processing tasks on the first media data elements, thereby to generate the second media data elements, the processing tasks being effected in a set of processing intervals; and a control entity configured for receiving a request for a first phase adjustment from the downstream network entity; modifying the set of processing intervals in which are effected the processing tasks in an attempt to accommodate the first phase adjustment; determining a second phase adjustment based on arrival characteristics of the first media data elements and the modified set of processing intervals; and releasing towards the upstream network entity a request for the second phase adjustment.

According to a second broad aspect, the present invention seeks to provide a method. The method comprises receiving from an upstream network entity a stream of first media data elements; releasing towards a downstream network entity a stream of second media data elements; effecting processing tasks on the first media data elements, thereby to generate the second media data elements, the processing tasks being effected in a set of processing intervals; receiving a request for a first phase adjustment from the downstream network entity; modifying the set of processing intervals in which are effected the processing tasks in an attempt to accommodate the first phase adjustment; determining a second phase adjustment based on arrival characteristics of the first media data elements and the modified set of processing intervals; and releasing towards the upstream network entity a request for the second phase adjustment.

According to a third broad aspect, the present invention seeks to provide a computer-readable medium comprising computer-readable program code which, when interpreted by a computing apparatus, causes the computing apparatus to execute a method. The computer-readable program code comprises first computer-readable program code for causing the computing apparatus to be attentive to receipt from an upstream network entity of a stream of first media data elements; second computer-readable program code for causing the computing apparatus to cause release towards a downstream network entity of a stream of second media data elements; third computer-readable program code for causing the computing apparatus to effect processing tasks on the first media data elements, thereby to generate the second media data elements, the processing tasks being effected in a set of processing intervals; fourth computer-readable program code for causing the computing apparatus to be attentive to receipt of a request for a first phase adjustment from the downstream network entity; fifth computer-readable program code for causing the computing apparatus to modify the set of processing intervals in which are effected the processing tasks in an attempt to accommodate the first phase adjustment; sixth computer-readable program code for causing the computing apparatus to determine a second phase adjustment based on arrival characteristics of the first media data elements and the modified set of processing intervals; and seventh computer-readable program code for causing the computing apparatus to cause release towards the upstream network entity of a request for the second phase adjustment.

According to a fourth broad aspect, the present invention seeks to provide a system, which comprises a first network entity and a second network entity. The first network entity comprises an I/O configured to receive a stream of first media data elements and to release towards a downstream network entity a stream of second media data elements; a processing engine configured to effect first processing tasks on the first media data elements, thereby to generate the second media data elements, the first processing tasks being effected in a set of first processing intervals; and a control entity configured for: receiving a request for a first phase adjustment from the downstream network entity; modifying the set of first processing intervals in which are effected the first processing tasks in an attempt to accommodate the first phase adjustment; and determining a second phase adjustment based on arrival characteristics of the first media data elements and the modified set of first processing intervals. The second network entity comprises an I/O configured to receive a stream of original media data elements and to release the stream of first media data elements; a processing engine configured to effect second processing tasks on the original media data elements, thereby to generate the first media data elements, the second processing tasks being effected in a set of second processing intervals; and a control entity configured for modifying the set of second processing intervals in which are effected the second processing tasks in an attempt to accommodate the second phase adjustment.

In the system according to the fourth broad aspect, the second processing tasks can comprise a task of determining boundaries for frames within the original media data elements; and a task of assembling the frames into the first media data elements.

In the system according to the fourth broad aspect, the second processing tasks can comprise a task of determining boundaries for frames within the original media data elements; a task of coding the frames into parametrized data; and a task of assembling the parametrized data into the first media data elements.

In the system according to the fourth broad aspect, the media can be speech and the task of coding can comprise speech coding.

In the system according to the fourth broad aspect, the first processing tasks can include at least one of speech coding, speech decoding, voice enhancement, noise suppression and automatic gain control (AGC).

In the system according to the fourth broad aspect, each of the first processing intervals in the set of processing intervals can be associated with a respective duration and a respective activation instant, the control entity of the first network entity can be configured to modify the set of first processing intervals in which are effected the first processing tasks by modifying at least one of the duration and the activation instant of at least one of the first processing intervals in the set of first processing intervals.

In the system according to the fourth broad aspect, each of the second processing intervals in the set of processing intervals can be associated with a respective duration and a respective activation instant, the control entity of the second network entity can be configured to modify the set of second processing intervals in which are effected the second processing tasks by modifying at least one of the duration and the activation instant of at least one of the second processing intervals in the set of second processing intervals.

In the system according to the fourth broad aspect, the control entity of the first network entity can implement a scheduler for performing the modifying of the set of first processing intervals.

In the system according to the fourth broad aspect, the control entity of the second network entity can implement a second scheduler for performing the modifying of the set of second processing intervals.

In the system according to the fourth broad aspect, the first processing tasks can be effected periodically with a first period and the second processing tasks can be effected periodically with a second period.

In the system according to the fourth broad aspect, the first and second periods can be identical.

In the system according to the fourth broad aspect, the first and second periods can be different.

In the system according to the fourth broad aspect, the arrival characteristics of the first media data elements can comprise arrival times of the first media data elements within respective fixed-duration periods.

In the system according to the fourth broad aspect, the control entity of the first network entity can be further configured to reduce the first phase adjustment by an integer multiple of the period when the first phase adjustment exceeds the period.

In the system according to the fourth broad aspect, the first media data elements or the second media data elements can be Internet Protocol packets or Asynchronous Transfer Mode cells.

In the system according to the fourth broad aspect, the first media data elements or the second media data elements can be Time Division Multiplexed frames.

In the system according to the fourth broad aspect, the original media data elements can be samples of a media signal.

In the system according to the fourth broad aspect, the first network entity can further comprise an input buffer for storing the first media data elements upon receipt via the I/O and prior to processing by the processing engine of the first network entity.

In the system according to the fourth broad aspect, the first network entity can further comprise an output buffer for storing the second media data elements after generation by the processing engine of the first network entity and prior to release via the I/O.

According to a fifth broad aspect, the present invention seeks to provide a method, comprising, at a first network entity: receiving a stream of first media data elements and releasing towards a downstream network entity a stream of second media data elements; effecting first processing tasks on the first media data elements, thereby to generate the second media data elements, the first processing tasks being effected in a set of first processing intervals; receiving a request for a first phase adjustment from the downstream network entity; modifying the set of first processing intervals in which are effected the first processing tasks in an attempt to accommodate the first phase adjustment; and determining a second phase adjustment based on arrival characteristics of the first media data elements and the modified set of first processing intervals. The method also comprises, at a second network entity: receiving a stream of original media data elements and releasing the stream of first media data elements; effecting second processing tasks on the original media data elements, thereby to generate the first media data elements, the second processing tasks being effected in a set of second processing intervals; and modifying the set of second processing intervals in which are effected the second processing tasks in an attempt to accommodate the second phase adjustment.

According to a sixth broad aspect, the present invention seeks to provide a system, which comprises a first network entity and a second network entity. The first network entity comprises an input configured to receive a stream of first media data elements; a processing engine configured to effect first processing tasks on the first media data elements, the first processing tasks being effected in a set of first processing intervals; and a control entity configured to determine a first phase adjustment based on arrival characteristics of the first media data elements and the set of first processing intervals. The second network entity comprises an I/O configured to receive a stream of original media data elements and to release the stream of first media data elements; a processing engine configured to effect second processing tasks on the original media data elements, thereby to generate the first media data elements, the second processing tasks being effected in a set of second processing intervals; and a control entity configured for: modifying the set of second processing intervals in which are effected the second processing tasks in an attempt to accommodate the first phase adjustment; determining a second phase adjustment based on arrival characteristics of the original media data elements and the modified set of second processing intervals; and releasing towards an upstream network entity a request for the second phase adjustment.

In the system according to the sixth broad aspect, each of the second processing intervals in the set of processing intervals can be associated with a respective duration and a respective activation instant, and the control entity of the second network entity can be configured to modify the set of second processing intervals in which are effected the second processing tasks by modifying at least one of the duration and the activation instant of at least one of the second processing intervals in the set of second processing intervals.

In the system according to the sixth broad aspect, the first processing tasks can include at least one of modulation onto a carrier signal, formatting and adding radio frequency (RF) control commands.

In the system according to the sixth broad aspect, the control entity of the second network entity can implement a scheduler for performing the modifying.

In the system according to the sixth broad aspect, the second processing tasks can include at least one of speech coding, speech decoding, voice enhancement, noise suppression and automatic gain control (AGC).

In the system according to the sixth broad aspect, the second processing tasks can be effected periodically.

In the system according to the sixth broad aspect, the second processing tasks can be effected periodically with a period of 20 ms.

In the system according to the sixth broad aspect, the arrival characteristics of the second media data elements can comprise arrival times of the second media data elements within respective fixed-duration periods.

In the system according to the sixth broad aspect, the control entity of the second network entity can be further configured to reduce the first phase adjustment by an integer multiple of the period when the first phase adjustment exceeds the period.

In the system according to the sixth broad aspect, the original media data elements or the first media data elements can be Internet Protocol packets or Asynchronous Transfer Mode cells.

In the system according to the sixth broad aspect, the first media data elements or the second media data elements can be Time Division Multiplexed frames.

In the system according to the sixth broad aspect, the second network entity can further comprise an input buffer for storing the original media data elements upon receipt via the I/O and prior to processing by the processing engine of the second network entity.

In the system according to the sixth broad aspect, the second network entity can further comprise an output buffer for storing the first media data elements after generation by the processing engine of the second network entity and prior to release via the I/O.

In the system according to the sixth broad aspect, the first network entity can be a radio network node.

In the system according to the sixth broad aspect, the processing entity of the first network entity can be further configured to generate signals for transmission over an air interface.

In the system according to the sixth broad aspect, the first network entity can further comprise an antenna subsystem for transmission of the signals over the air interface.

According to a seventh broad aspect, the present invention seeks to provide a method, which comprises, at a first network entity: receiving a stream of first media data elements; effecting first processing tasks on the first media data elements, the first processing tasks being effected in a set of first processing intervals; and determining a first phase adjustment based on arrival characteristics of the first media data elements and the set of first processing intervals. The method also comprises, at a second network entity: receiving a stream of original media data elements and releasing the stream of first media data elements; effecting second processing tasks on the original media data elements, thereby to generate the first media data elements, the second processing tasks being effected in a set of second processing intervals; modifying the set of second processing intervals in which are effected the second processing tasks in an attempt to accommodate the first phase adjustment; determining a second phase adjustment based on arrival characteristics of the original media data elements and the modified set of second processing intervals; and releasing towards an upstream network entity a request for the second phase adjustment.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
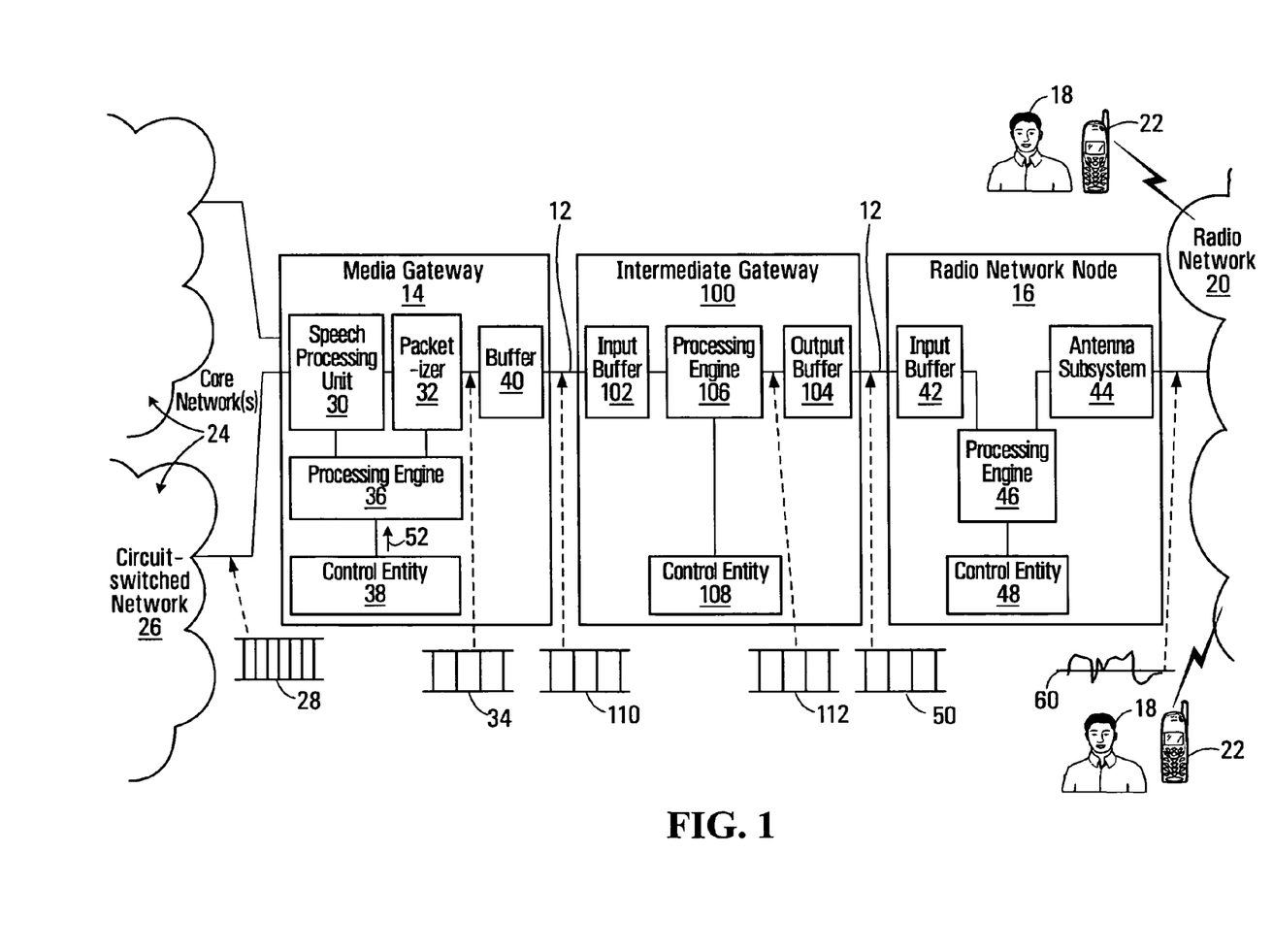
FIG. 1 is a block diagram of an intermediate gateway disposed between a media gateway and a radio network node, in accordance with a specific non-limiting embodiment of the present invention.

With reference to FIG. 1 there is shown an architecture comprising a communication link 12 between a media gateway 14 and a radio network node 16, which traverses an intermediate gateway 100. The radio network node 16 services end users 18 in a radio network 20 such as a cellular network, a Wi-Max based network, etc. The end users 18 employ respective end user devices 22 to enjoy mobile communication services such as voice and data services. The media gateway 14 is connected to one or more core networks 24, which connect the end user devices 22 to the outside world and allow the end users 18 to place/answer voice calls, surf the Internet, exchange text or instant messages, etc.

One of the core networks 24 may be a circuit-switched network 26 transporting a plurality of sample streams in accordance with a particular format or standard. An example non-limiting format or standard is G.711, which represents logarithmic pulse-code modulation (PCM) samples of a voice-band signal (i.e., a signal in the voice frequency range), at a rate of 8000 samples/second (or 125 microseconds per sample). One or more sample streams 28 obtained in this manner may be provided from the circuit-switched network 26 to the media gateway 14, for eventual delivery of respective speech signals to respective ones of the end users 18. Of course, the sample streams 28 may be in accordance with any other format or standard without departing from the scope of the present invention.

The media gateway 14 comprises suitable hardware, software, firmware and/or control logic for implementing a speech processing unit 30. The speech processing unit 30 is operable to take a fixed number of samples (namely, a frame of speech samples) in a given one of the sample streams 28 associated with a given one of the end users 18, and derive a set of parameters representative of the speech contained in that frame of speech samples. Thus, by operating on consecutive frames of speech samples in a given one of the sample streams 28, the speech processing unit 30 produces a stream of parameter sets.

In a non-limiting embodiment, the speech processing unit 30 can be a vocoder. In a specific non-limiting example, for a given frame of speech samples spanning 20 milliseconds (ms) (i.e., comprising 160 samples at a sampling rate of 8000 samples/second), the set of parameters derived by the speech processing unit 30 implementing a vocoder includes parameters pertaining to various characteristics of the speech contained in those 160 samples. Example parameters include spectral transition, line spectrum information, pitch delay, delta delay, adaptive codebook gain, fixed codebook shape, fixed codebook gain and frame energy, although other parameters can be derived without departing from the scope of the present invention. Also, other frame sizes are within the scope of the present invention, including but not limited to 5 ms and 10 ms.

The media gateway 14 also comprises suitable hardware, software, firmware and/or control logic for implementing a packetizer 32. The packetizer 32 is operable to take the parameter sets output by the speech processing unit 30 and formulate them into respective speech data elements 34 for transmission to the end users 18 via the radio network node 16. More specifically, parameter sets derived from frames of speech samples in a common one of the sample streams 28 are assembled into speech data elements 34 for the end user associated with the given one of the sample streams 28. Thus, when there is more than one sample stream 28, there is also more than one stream of speech data elements 34, although they may be interleaved or otherwise combined into a single data stream by the packetizer 32. The speech data elements 34 may be in a suitable format including but not limited to Internet Protocol (IP) packets, Asynchronous Transfer Mode (ATM) cells and Time Division Multiplexed frames, although other formats can be used without departing from the scope of the present invention.

The media gateway 14 comprises a processing engine 36 is operable to effect various processing tasks for the speech processing unit 30 and the packetizer 32 mentioned above. During each 20-ms period corresponding to a frame of speech samples, the speech processing unit 30 and the packetizer 32 code and packetize 160 samples of speech from a given one of the sample streams 28, producing a respective one of the speech data elements 34 containing a set of coded speech parameters. During the next such period, the speech processing unit 30 and the packetizer 32 code and packetize the next 160 samples of speech from the given one of the sample streams 28, producing a next one of the speech data elements 34 containing a set of coded speech parameters, and so on.

In the present example, the time it takes to code and packetize 20 milliseconds' worth of speech actually takes less than 20 ms. Thus, the processing engine 36 has some spare processing capacity. In fact, with a sufficiently powerful processing engine 36, the media gateway 14 may be able to code and packetize multiple sample streams 28, for respective ones of the end users 18.

The media gateway 14 also comprises suitable hardware, software, firmware and/or control logic for implementing a control entity 38. The control entity 38 executes a scheduler that is responsible for allocating the various processing tasks of the processing engine 36 (including those effected for the speech processing unit 30 and the packetizer 32) to a set of processing intervals in each 20-ms period. For example, for a given processing task, the scheduler can determine the duration and activation instant of a processing interval during which that processing task is to be effected. Also, upon realizing that a certain new task needs to be performed, the control entity 38 can break up the new task into sub-tasks, or can re-schedule the existing tasks to make "room" for the new task.

In addition, the control entity 38 is operable to control the frame boundaries within the sample streams 28. That is, for a particular one of the sample streams 28, the control entity 38 decides which sample is to be taken by the speech processing unit 30 as the "first" sample in a given set of 160 samples constituting a given frame of speech samples. Thus, the relative position (or alignment) of a frame of speech samples within the particular one of the sample streams 28 is adjustable by providing a control signal 52 to the speech processing unit 30.

The media gateway 14 further comprises suitable hardware, software, firmware and/or control logic for implementing a buffer (or memory) 40. The buffer 40 is operable to temporarily store the speech data elements 34 at the output of the packetizer 32, in order to provide a smoother flow of speech data elements during periods of variable delay at a downstream entity such as the intermediate gateway 100 and/or the radio network node 16.

Turning now to the intermediate gateway 100, this network entity comprises suitable hardware, software, firmware and/or control logic for implementing an input buffer 102, an output buffer 104, a processing engine 106 and a control entity 108. The input buffer 102 stores speech data elements 110 received from the media gateway 14. The speech data elements 110 in the input buffer 102 correspond to delayed versions of the speech data elements 34 that were released by the packetizer 32 and transited the buffer 40 at the media gateway 14. Thus, the speech data elements 110 may be in a suitable format including but not limited to Internet Protocol (IP) packets, Asynchronous Transfer Mode (ATM) cells and Time Division Multiplexed frames.

The processing engine 106 is operable to effect various processing tasks on the speech data elements 110 taken from the input buffer 102. A non-limiting example of a processing task that can be effected by the processing engine 106 is transcoding, which consists of decoding and then re-encoding the coded speech carried by the speech data elements 110. Other non-limiting examples of processing tasks that can be effected by the processing engine 106 include voice enhancement, noise suppression and automatic gain control (AGC).

Operation of the processing engine 106 on the speech data elements 110 in the input buffer 102 results in the generation of speech data elements 112 (e.g., packets) that are placed into the output buffer 104. The speech data elements 110 in the input buffer 102 may therefore have a correspondence with the speech data elements 112 in the output buffer 104. This correspondence may be on a one-to-one basis, a many-to-one basis or a one-to-many basis, for example. In the present example, a one-to-one correspondence between the speech data elements 110 in the input buffer 102 and the speech data elements 112 in the output buffer 104 is assumed. However, this need not be the case in every embodiment of the present invention and, indeed, at least one other possibility is described later on in this specification.

Assuming therefore that a one-to-one correspondence exists between the speech data elements 110 in the input buffer 102 and the speech data elements 112 in the output buffer 104, the intermediate gateway 100 has a 20-ms period available to process each of the speech data elements 110 in the input buffer 102. During each such period, the processing engine 106 effects processing tasks on a given one of the speech data elements 110 in the input buffer 102 and places a corresponding one of the speech data elements 112 in the output buffer 104. During the next such period, the processing engine 106 processes a next one of the speech data elements 110 in the input buffer 102, and so on.

In the present example, the time it takes to effect processing tasks on a speech data element representing 20 ms of speech actually takes less than 20 ms and, in many cases, it will take significantly less.

The control entity 108 executes a scheduler that is responsible for allocating the various processing tasks of the processing engine 106 to a set of processing intervals in each 20-ms period. This includes allocating the tasks of retrieving one or more of the speech data elements 110 from the input buffer 102, processing it/them, and depositing the resultant corresponding speech data element(s) 112 into the output buffer 104. Thus, for example, for a given processing task, the scheduler in the control entity 108 can determine the duration and activation instant of a processing interval during which that processing task is to be effected.

It should be appreciated that depending on the arrival times of the speech data elements 110 in the input buffer 102 within respective 20-ms periods, it is possible that a given one of the speech data elements 110 will be ready for processing, but that the processing engine 106 might not be scheduled to process it immediately due to other commitments. For example, the processing engine 106 may be scheduled to perform other processing tasks either currently or over the time it would have taken to process the given one of the speech data elements 110 if it were to begin doing so immediately. Some time may therefore elapse while waiting for the processing engine 106 to become available. As a result, within each 20-ms period, the input buffer 102 will need to temporarily store one or more speech data elements which cannot be processed until the scheduled time at which the processing engine 106 is expected to become available to effect the processing task in question. In the absence of synchronization between the media gateway 14 and the intermediate gateway 100, the elapsed time is unpredictable and can range from zero to the duration of the frame, which is in this case 20 ms.

Continuing with the description of the architecture of FIG. 1, the radio network node 16 comprises suitable hardware, software, firmware and/or control logic for implementing an input buffer 42, an antenna subsystem 44, a processing engine 46 and a control entity 48. The input buffer 42 stores speech data elements 50 received from the intermediate gateway 100. The speech data elements 50 in the input buffer 42 correspond to delayed versions of the speech data elements 112 that were released by the processing engine 106 and transited the output buffer 104 of the intermediate gateway 100. Thus, the speech data elements 50 may be in a suitable format including but not limited to Internet Protocol (IP) packets, Asynchronous Transfer Mode (ATM) cells and Time Division Multiplexed frames.

The processing engine 46 is operable to effect various processing tasks on the speech data elements 50 taken from the input buffer 42. A non-limiting example of a processing task that can be effected by the processing engine 46 includes modulation onto a carrier signal. Other examples of a processing task that can be effected by the processing engine 46 include formatting of data and adding radio frequency (RF) control commands. An ultimate result of operation of the processing engine 46 on the speech data elements 50 in the input buffer 42 is the generation of signals 60 that are sent to the end users 18, over an air interface for example.

Similarly to the intermediate gateway 100, the radio network node 16 also has a 20-ms period available to process each of the speech data elements 50 in the input buffer 42. During each 20-ms period, the processing engine 46 effects processing tasks on a given one of the speech data elements 50 in the input buffer 42 and generates a corresponding one of the signals 60 for transmission via the antenna subsystem 44. During the next such period, the processing engine 46 processes a next one of the speech data elements 50 in the input buffer 42, and so on.

In the present example, the time it takes to effect processing tasks on a speech data element representing 20 ms of speech actually takes less than 20 ms and, in many cases, it will take significantly less.

The control entity 48 executes a scheduler that is responsible for allocating the various processing tasks of the processing engine 46 to a set of processing intervals in each 20-ms period. This includes allocating the tasks of retrieving one or more of the speech data elements 50 from the input buffer 42, processing it/them and providing the resultant signal(s) 60 from the antenna subsystem 44. Thus, for example, for a given processing task, the scheduler in the control entity 48 can determine the duration and activation instant of a processing interval during which that processing task is to be effected.

It should be appreciated that depending on the arrival times of the speech data elements 50 in the input buffer 42 within respective 20-ms periods, it is possible that a given one of the speech data elements 50 will be ready for processing, but that the processing engine 46 might not be scheduled to process it immediately due to other commitments. For example, the processing engine 46 may be scheduled to perform other processing tasks either currently or over the time it would have taken to process a given one of the speech data elements 50 if it were to begin doing so immediately. Some time may therefore elapse while waiting for the processing engine 46 to become available. As a result, within each 20-ms period, the input buffer 42 will need to temporarily store one or more speech data elements which cannot be processed until the scheduled time at which the processing engine 46 is expected to become available to effect the processing task in question. In the absence of synchronization between the intermediate gateway 100 and the radio network node 16, the elapsed time is unpredictable and can range from zero and the duration of the frame, which is in this case 20 ms.

Figure 2:
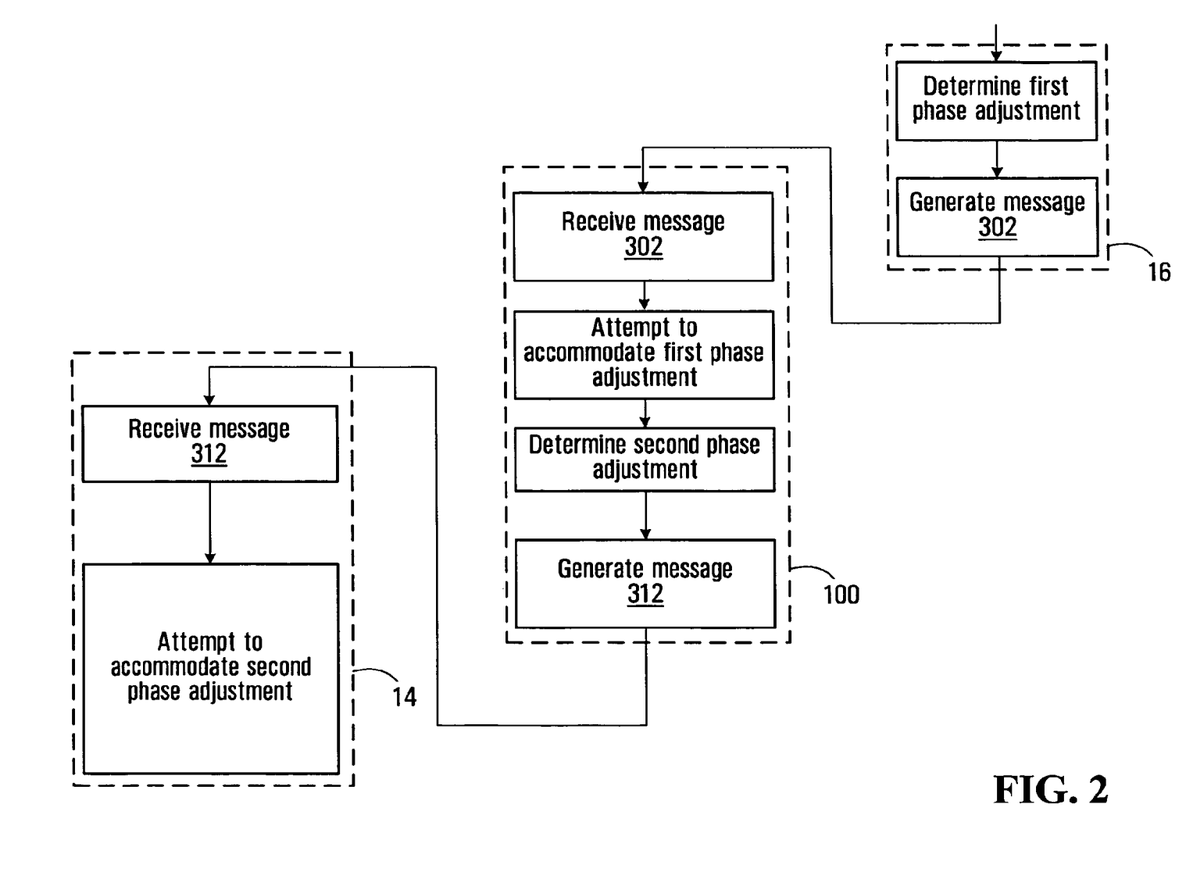
FIG. 2 illustrates a flow of messages from the radio network node to the intermediate gateway and from the intermediate gateway to the media gateway in order to achieve distributed time alignment in accordance with a non-limiting embodiment of the present invention.

An operational description of a non-limiting embodiment of the present invention is now provided with reference to FIG. 2.

At the Radio Network Node 16

The control entity 48 determines that the speech data elements 50 would benefit from an alignment of their arrival times at the radio network node 16. Accordingly, the control entity 48 determines a first phase adjustment based on the arrival characteristics of the speech data elements 50 at the input buffer 42 (which can be estimated, inferred or measured) and also based on the set of processing intervals during which the processing tasks effected by the processing engine 46 are effected.

The first phase adjustment, which represents a desired re-alignment of the arrival times of the speech data elements 50, can be selected to satisfy a variety of objectives. For example, it may be the case, under prevailing conditions, that the current arrival times of the speech data elements 50 may cause them to undergo a superfluous waiting time before being processed by the processing engine 46. It may be the case that by delaying their arrival times by X number of milliseconds, the waiting time of the speech data elements 50 as they transit through the radio network node 16 could be reduced. The first phase adjustment would be this X number of milliseconds. Naturally, the first phase adjustment can be selected to satisfy other objectives, including but not limited to minimization of memory usage, optimizing computational efficiency when performing multi-channel processing, etc.

The control entity 48 then formulates a message 302 and sends it to the entity located upstream from the radio network node 16, namely the intermediate gateway 100. The message 302 contains a request for the aforesaid first phase adjustment.

At the Intermediate Gateway 100

The intermediate gateway 100 receives the message 302 and decodes the information contained therein, namely the request for the first phase adjustment, issued by the radio network node 16.

The control entity 108 modifies the set of processing intervals in which are effected the processing tasks of the processing engine 106 in an attempt to accommodate the first phase adjustment. For example, if the first phase adjustment was a delay of X milliseconds, then the control entity 108 attempts to change the duration and/or the activation instant of the processing intervals during which are effected the processing tasks of the processing engine 106 so that processing of the speech data elements 110 and/or release of the speech data elements 112 into the output buffer 104 is delayed by X milliseconds relative to the currently prevailing situation.

It should be appreciated that the first phase adjustment may be valid only within a certain range. More specifically, where the speech data elements 110, 112 in the input and output buffers 102, 104 each represent 20 ms' worth of speech, the first phase adjustment will be between 0 and 20 ms. Outside this range, i.e., where the first phase adjustment is greater than 20 ms (or is negative), then the actual phase adjustment used for modifying the processing intervals will be the value of the first phase adjustment modulo 20 ms.

The control entity 108 then determines that the speech data elements 110 would benefit from an alignment of their arrival times at the intermediate gateway 100 within respective 20-ms periods. Accordingly, the control entity 108 determines a second phase adjustment based on the arrival characteristics of the speech data elements 110 at the input buffer 102 (which can be estimated, inferred or measured) and also based on the modified set of processing intervals during which the processing tasks effected by the processing engine 106 are effected.

The second phase adjustment, which represents a desired re-alignment of the arrival times of the speech data elements 110, can be selected to satisfy a variety of objectives. For example, it may be the case, under prevailing conditions, that the current arrival times of the speech data elements 110 may cause them to undergo a superfluous waiting time before being processed by the processing engine 106. It may be the case that by delaying their arrival times by Y number of milliseconds, the waiting time of the speech data elements 110 as they transit through the intermediate gateway 100 could be reduced. The second phase adjustment would be this Y number of milliseconds. Naturally, the second phase adjustment can be selected to satisfy other objectives, including but not limited to minimization of memory usage, optimizing computational efficiency when performing multi-channel processing, etc.

Next, the control entity 108 formulates a message 312 and sends it to the entity located upstream from the intermediate gateway 100, namely the media gateway 14. The message 312 contains a request for the aforesaid second phase adjustment.

At the Media Gateway 14

The media gateway 14 receives the message 312 and decodes the information contained therein, namely the request for the second phase adjustment, issued by the intermediate node 100.

The control entity 38 modifies the set of processing intervals in which are effected the processing tasks of the processing engine 36 in an attempt to accommodate the second phase adjustment. For example, if the second phase adjustment was a delay of Y milliseconds, then the control entity 38 attempts to change the duration and/or the activation instant of the processing intervals during which are effected the processing tasks of the processing engine 36 so that release of the speech data elements 34 into the buffer 40 is delayed by Y milliseconds relative to the currently prevailing situation.

Specifically, where the media gateway 14 is responsible for speech coding, and if the second phase adjustment is a delay of 11 milliseconds, then the control entity 38 may attempt to shift the frame boundaries in the sample streams 28 by 11 milliseconds. In other words, the control entity 38 changes which sample it considers to be the "first" sample in each frame of speech.

In the above manner, "distributed" time alignment can be achieved, which can have various advantages. For example, one can achieve a reduction in the overall delay between the time at which a speech sample is generated and the time at which it is ready for distribution via the antenna subsystem 44 of the radio network node 16. This reduced overall delay—or "slack"—will have been achieved by a sequence of cascading phase adjustments. As a result, the signals 60 are still released by the radio network node 16 at the same time as before, but the speech information they contain will be "fresher", i.e., more recent.

Distributed time alignment may also be useful where objectives other than minimized overall delay are sought, such as when memory usage is to be minimized or when computational efficiency gains are sought in the context of multi-channel processing.

Persons skilled in the art will appreciate that the above technique can be applied independently to plural ones of the sample streams 28 destined for respective ones of the end users 18, in order to achieve distributed time alignment for each such sample stream.

As mentioned above, the correspondence between the speech data elements 110 in the input buffer 102 and the speech data elements 112 in the output buffer 104 need not be one-to-one. For example, consider the case where the aforesaid correspondence is many-to-one and, specifically, two-to-one. Under such a scenario, frames might have a 10-ms duration, and thus the speech data elements 34 generated by the packetizer 32 in the media gateway 14 would contain coded speech parameters for 10 milliseconds' worth of speech. At the intermediate gateway 100, two "short" (i.e., 10-ms) packets 110 in the input buffer 102 could be used to create one corresponding "long" (i.e., 20-ms) packet 112 in the output buffer 104. From the perspective of the radio network node 16, nothing would change, because this entity would still receive the speech data elements 50 from the intermediate gateway 100, of which one would be processed in each 20-ms period for delivery to a given one of the end user devices 22.

Consider now the case where the control entity 48 at the radio network node 16 determines that the speech data elements 50 would benefit from an alignment of their arrival times (for example, to achieve reduced delay or memory usage). The control entity 48 sends the (previously described) message 302 to the intermediate gateway 100. As before, the message 302 contains a request for a first phase adjustment.

The intermediate gateway 100 receives the message 302 and decodes the request contained therein, which is indicative of the first phase adjustment. The control entity 108 modifies the set of processing intervals in which are effected the processing tasks of the processing engine 106 in an attempt to accommodate the first phase adjustment. The control entity 108 then determines a second phase adjustment based on the arrival characteristics of the speech data elements 110 at the input buffer 102 (within periods of 10 milliseconds—the duration of one of the "short" packets) and also based on the modified set of processing intervals (within periods of 20 milliseconds) during which the processing tasks effected by the processing engine 106 are effected.

Now, if the second phase adjustment exceeds 10 ms, the intermediate gateway 100 applies a modulo 10 ms function to the second phase adjustment, thereby to obtain a "residual" phase adjustment, which will fall into the range of zero to just under 10 milliseconds. The intermediate gateway 100 then tries to accommodate this residual phase adjustment, which will have a value of less than 10 ms. The intermediate gateway sends this as the $2^{nd}$ phase adjustment to the media gateway 14. The remainder of the process is as described above.

Persons skilled in the art will also recall that in the above example embodiment, the media gateway 14 implements a speech processing unit 30 for outputting a stream of parameter sets from consecutive frames of speech samples in a given one of the sample streams 28. However, the speech processing unit 30 may instead be implemented by the intermediate gateway 100, which would eliminate the need for any transcoding to be performed at the media gateway 14. Under this scenario, the media gateway 14 implements a modified version of the packetizer 32, which will now produce speech data elements each containing a frame of speech samples (e.g., 160 samples) rather than a set of coded speech parameters. Upon receipt of the speech data elements containing frames of speech samples, the intermediate gateway 100 invokes the speech processing unit (which is now part of the processing engine 106).

Clearly, the processing performed by the processing engine 106 of the intermediate gateway 100 will now be more intensive than that of the embodiment shown in FIG. 1, while the processing performed by the processing engine 36 of the media gateway 14 will be correspondingly less intensive. Nonetheless, it should be appreciated that the media gateway 14 remains in control of defining the frame boundaries within the corresponding one of the sample streams 28 based on a request for a second phase adjustment received from the intermediate gateway 100. Therefore, the present invention can continue to be used in order to achieve various objectives through distributed time alignment, such as (but not limited to) a reduction in the overall delay experienced by speech that traverses the communication link 12.

It should be appreciated that the intermediate gateway 100 may be physically separate from the radio network node 16 and the media gateway 14. In alternative embodiments, the intermediate gateway 100 may be integrated with either or both of the radio network node 16 and the media gateway 14. Furthermore, it should be appreciated that one or more other gateways may be located between the intermediate gateway 100 and the radio network node 16 or the media gateway 14. In fact, one or more of these other gateways may participate in an extension of the techniques described herein, whereby three or more gateways may each undertake, in cascading fashion, a re-scheduling of the processing tasks effected by the respective gateway to the processing intervals available for processing at that gateway.

Although the above description has focused on the direction of communication from the media gateway 14 to the radio network node 16, persons skilled in the art will appreciate that other embodiments of invention can be applied to achieving time alignment for speech data elements traveling in the opposite direction of communication, namely from the radio network node 16 to the media gateway 14. Thus, it should be generally understood that the request for a phase adjustment can originate from any source, not necessarily from the radio network node 16.

Persons skilled in the art should also appreciate that the distributed time alignment approach described herein may have applications in areas outside speech processing, such as in any media application, which includes streaming speech, audio and video applications, as well as combinations thereof. Therefore, the term "media" is used to denote the broad class of data contemplated herein, which includes speech data, video data, audio data, combinations thereof, and in a variety of formats including sampled, frame-based, parametrized, etc.

Those skilled in the art will also appreciate that in some embodiments, the functionality of the processing engines 36, 106, 46 and control entities 38, 108, 48 may be implemented using pre-programmed hardware or firmware elements (e.g., application specific integrated circuits (ASICs), electrically erasable programmable read-only memories (EEPROMs), etc.), or other related components. In other embodiments, the functionality of the processing engines 36, 106, 46 and control entities 38, 108, 48 may be achieved using a computing apparatus that has access to a code memory (not shown) which stores computer-readable program code for operation of the computing apparatus. The computer-readable program code could be stored on a medium which is fixed, tangible and readable directly by the processing engines 36, 106, 46 and control entities 38, 108, 48, (e.g., removable diskette, CD-ROM, ROM, fixed disk, USB drive), or the computer-readable program code could be stored remotely but transmittable to the processing engines 36, 106, 46 and control entities 38, 108, 48 via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

While specific embodiments of the present invention have been described and illustrated, it will be apparent to those skilled in the art that numerous modifications and variations can be made without departing from the scope of the invention as defined in the appended claims.

What is claimed is:

1. A network entity, comprising:
   an input configured to receive from an upstream network entity a stream of first media data elements;
   an output configured to release towards a downstream network entity a stream of second media data elements;
   a processing engine configured to effect processing tasks on the first media data elements, thereby to generate the second media data elements, the processing tasks being effected in a set of processing intervals;
   a control entity configured for:
      receiving a request for a first phase adjustment from the downstream network entity;
      modifying the set of processing intervals in which are effected the processing tasks in an attempt to accommodate the first phase adjustment;
      determining a second phase adjustment based on arrival characteristics of the first media data elements and the modified set of processing intervals;
      releasing towards the upstream network entity a request for the second phase adjustment.

2. The network entity defined in claim 1, wherein each of the processing intervals in the set of processing intervals is associated with a respective duration and a respective activation instant, wherein the control entity is configured to modify the set of processing intervals in which are effected the processing tasks by modifying at least one of the duration and the activation instant of at least one of the processing intervals in the set of processing intervals.

3. The network entity defined in claim 1, further comprising an input buffer for storing the first media data elements upon receipt from the upstream network entity and prior to processing by the processing engine.

4. The network entity defined in claim 3, further comprising an output buffer for storing the second media data elements after generation by the processing engine and prior to release towards the downstream network entity.

5. The network entity defined in claim 1, wherein the control entity implements a scheduler for performing said modifying.

6. The network entity defined in claim 1, wherein the processing tasks include at least one of speech coding, speech decoding, voice enhancement, noise suppression and automatic gain control (AGC).

7. The network entity defined in claim 1, wherein the media comprises speech.

8. The network entity defined in claim 1, wherein the media comprises data other than speech.

9. The network entity defined in claim 1, wherein the processing tasks are effected periodically.

10. The network entity defined in claim 1, wherein the processing tasks are effected periodically with a period of 20 milliseconds.

11. The network entity defined in claim 1, wherein the arrival characteristics of the first media data elements comprise arrival times of the first media data elements within respective fixed-duration periods.

12. The network entity defined in claim 11, wherein the control entity is further configured to reduce the first phase adjustment by an integer multiple of said period when the first phase adjustment exceeds said period.

13. The network entity defined in claim 11, wherein the second media data elements exhibit a correspondence with the first media data elements.

14. The network entity defined in claim 13, wherein the correspondence with the first data elements is one-to-one.

15. The network entity defined in claim 13, wherein the correspondence with the first data elements is many-to-one.

16. The network entity defined in claim 13, wherein the correspondence with the first data elements is one-to-many.

17. The network entity defined in claim 16, wherein each of the second media data elements is generated from a pair of the first media data elements.

18. The network entity defined in claim 1, wherein said first media data elements or said second media data elements are Internet Protocol packets or Asynchronous Transfer Mode cells.

19. The network entity defined in claim 1, wherein said first media data elements or said second media data elements are Time Division Multiplexed frames.

20. A method, comprising:
   a) at a first network entity:
      receiving a stream of first media data elements and releasing towards a downstream network entity a stream of second media data elements;
      effecting first processing tasks on the first media data elements, thereby to generate the second media data elements, the first processing tasks being effected in a set of first processing intervals;
      receiving a request for a first phase adjustment from the downstream network entity;
      modifying the set of first processing intervals in which are effected the first processing tasks in an attempt to accommodate the first phase adjustment; and
      determining a second phase adjustment based on arrival characteristics of the first media data elements and the modified set of first processing intervals;
   b) at a second network entity:

receiving a stream of original media data elements and releasing the stream of first media data elements;

effecting second processing tasks on the original media data elements, thereby to generate the first media data elements, the second processing tasks being effected in a set of second processing intervals; and modifying the set of second processing intervals in which are effected the second processing tasks in an attempt to accommodate the second phase adjustment.

21. A method, comprising:

a) at a first network entity:

receiving a stream of first media data elements;

effecting first processing tasks on the first media data elements, the first processing tasks being effected in a set of first processing intervals;

determining a first phase adjustment based on arrival characteristics of the first media data elements and the set of first processing intervals;

b) at a second network entity:

receiving a stream of original media data elements and releasing the stream of first media data elements;

effecting second processing tasks on the original media data elements, thereby to generate the first media data elements, the second processing tasks being effected in a set of second processing intervals;

modifying the set of second processing intervals in which are effected the second processing tasks in an attempt to accommodate the first phase adjustment;

determining a second phase adjustment based on arrival characteristics of the original media data elements and the modified set of second processing intervals; and releasing towards an upstream network entity a request for the second phase adjustment.

\* \* \* \* \*